United States Patent [19]
Werner

[11] 3,874,208
[45] Apr. 1, 1975

[54] SPINNING ADAPTER
[76] Inventor: John A. Werner, 11602 Watertown Plank Rd., Wauwatosa, Wis. 53226
[22] Filed: Sept. 7, 1973
[21] Appl. No.: 395,070

[52] U.S. Cl. .................................................. 72/84
[51] Int. Cl. .............................................. B21d 22/16
[58] Field of Search ............ 72/75, 77, 78, 85, 370, 72/84

[56] References Cited
UNITED STATES PATENTS

| | | | |
|---|---|---|---|
| 1,418,697 | 6/1922 | Brinkman | 72/75 |
| 1,712,118 | 5/1929 | Powers | 72/85 |
| 1,778,181 | 10/1930 | Brinkman | 72/75 |
| 1,783,384 | 12/1930 | Mueller | 72/75 |
| 2,682,849 | 7/1954 | Wright | 72/85 |
| 2,882,851 | 4/1959 | Graves | 72/85 |
| 2,960,051 | 11/1960 | Darlington | 72/85 |

*Primary Examiner*—Richard J. Herbst
*Attorney, Agent, or Firm*—Andrus, Sceales, Starke & Sawall

[57] ABSTRACT

A spinning adapter for spinning a tubular workpiece to a predetermined decreased dimension has a quill which is secured to the carriage of a machine tool having a headstock with a rotary chuck thereon to receive and rotate the workpiece. The quill is hydraulically movable on the carriage in axial alignment with the headstock. A mandrel is adapted to be secured inside the quill at various positions and is of a size to be inserted inside the workpiece. The forward end of the quill has a plurality of circumferentially spaced reducing rollers journaled thereto around the mandrel which are disposed to be brought into engagement with the workpiece to spin the I.D. of the workpiece on the mandrel to the O.D. of the mandrel. The reducing rollers are held in the reducing position by set screws in engagement with cam surfaces of rotatable arms to which the rollers are pivoted and the rollers and mandrel are simultaneously moved longitudinally of the workpiece away from the headstock to accomplish the spinning operation.

8 Claims, 6 Drawing Figures

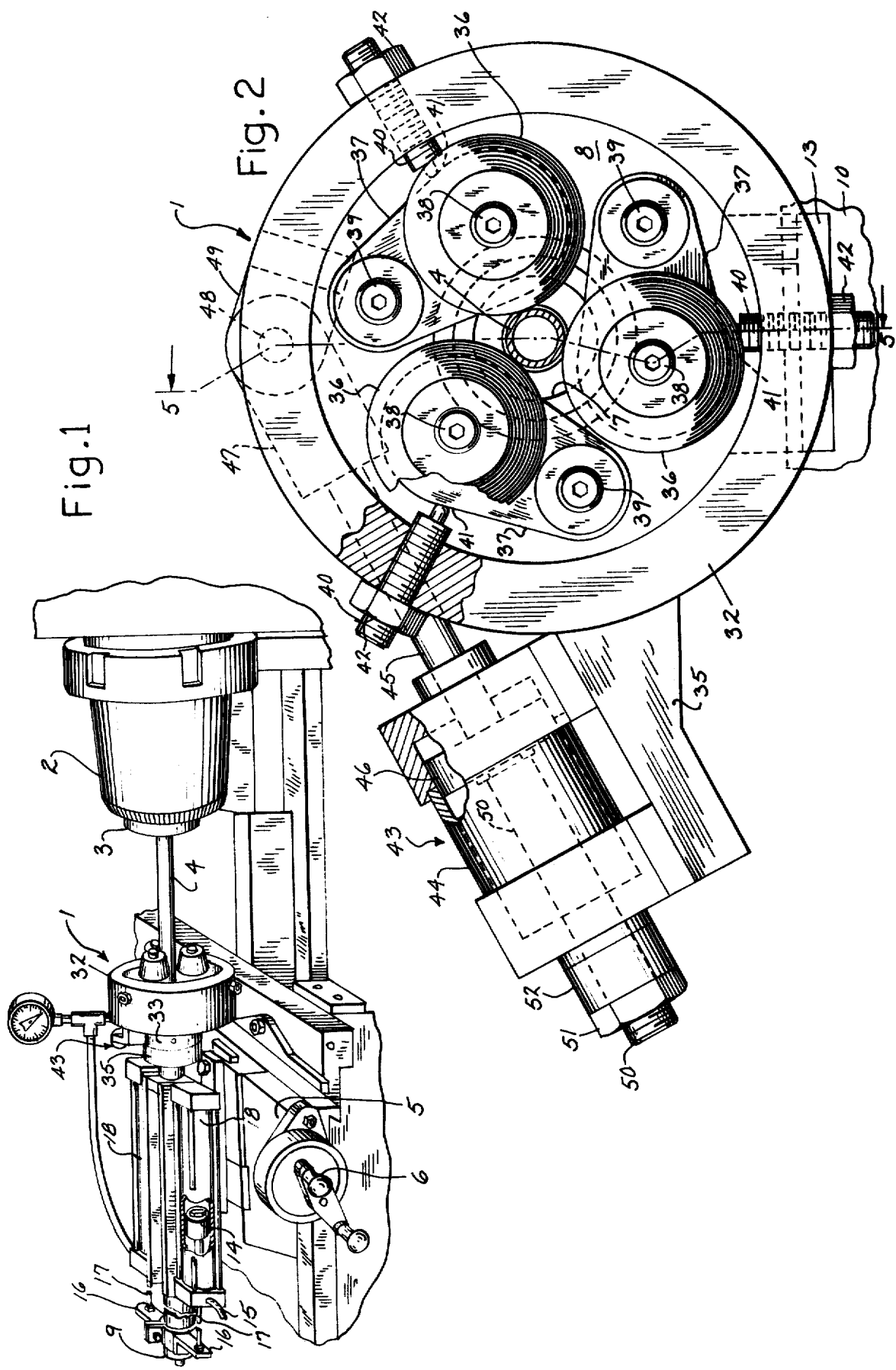

SPINNING ADAPTER

BACKGROUND OF THE INVENTION

The spinning adapter is a versatile tool which can be applied to any type of the usual machine tool which is capable of clamping and rotating a workpiece to spin the workpiece to a predetermined internal diameter of various dimensions. It eliminates the necessity of a special spinning machine in a shop where there may be only an occasional job to spin a tubular workpiece to a decreased dimension.

SUMMARY OF THE INVENTION

The invention is directed to a spinning adapter which is an independent unit which may be applied to any machine tool with a rotating spindle adapted to hold and rotate a tubular workpiece. In general it comprises the combination of a mandrel with the selected O.D. to provide the desired I.D. of the tubular workpiece to be spun. The mandrel is located inside a quill which has an inner diameter to receive the workpiece supported by the mandrel. The inner end of the mandrel is secured to a sliding sleeve located inside the mandrel and is adjustable axially of the quill by a rod which is disposed to move the sleeve longitudinally to locate the mandrel in the position desired inside the quill. A plurality of reducing rollers are secured to the forward end of the quill. The quill is hydraulically operated to move the rollers and mandrel axially simultaneously away from the headstock of the machine tool as the spinning operation is accomplished. The reducing rollers may be hydraulically placed into initial position with respect to the workpiece and are located in the desired reducing position by set screws which engage the cam surfaces of arms on the forward end of the quill to which the rollers are secured. The rollers are journaled on the arms to rotate with the workpiece.

DESCRIPTION OF THE DRAWINGS

FIG. 1 is a perspective view of the spinning adapter assembled on the carriage of a machine tool with the tubular workpiece in place for spinning to the desired decreased dimension in the spinning adapter and with parts broken away to illustrate the hydraulic operation of the adapter;

FIG. 2 is a front end view of the adapter of the invention with the rollers in a position engaging the workpiece for spinning the latter;

DETAILED DESCRIPTION OF THE INVENTION

Figure 3:
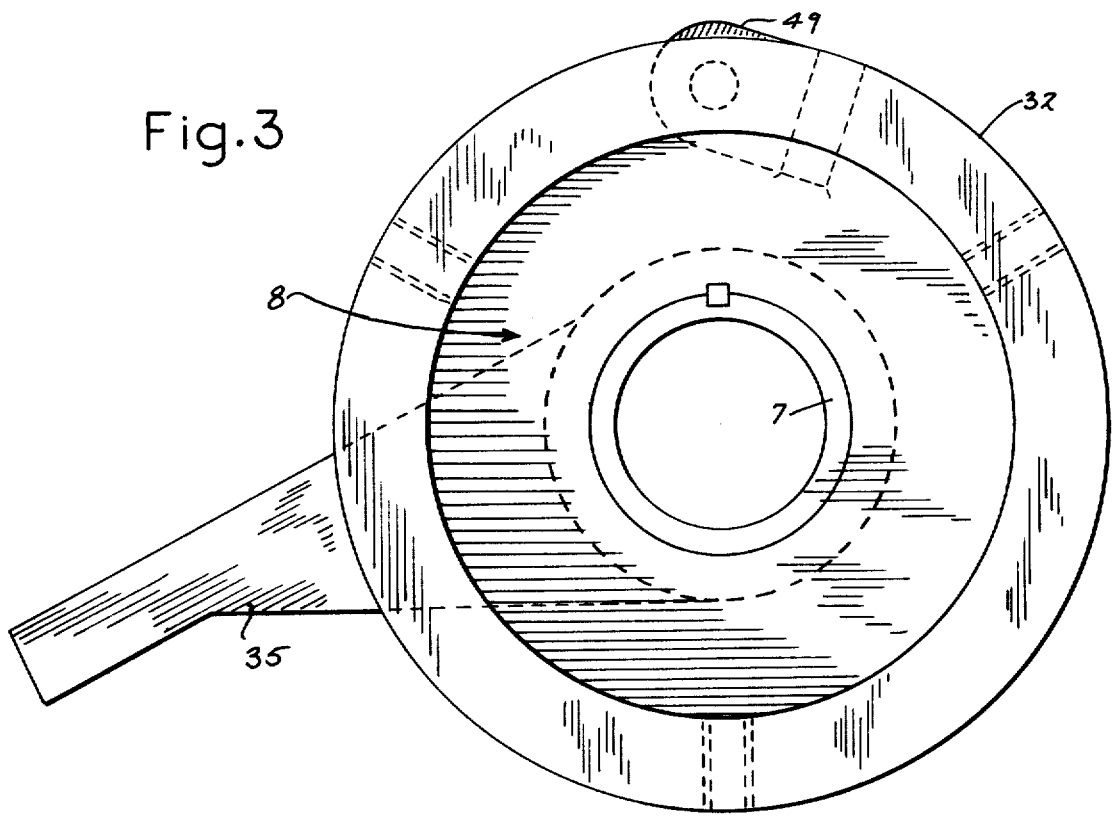
FIG. 3 is an end view of the recessed flanged plate of the adapter.
Figure 4:
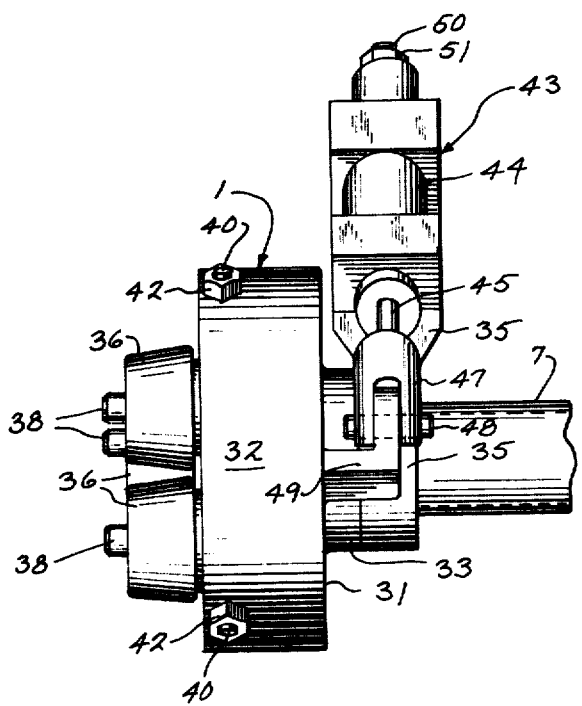
FIG. 4 is an elevation view of the adapter head illustrating the cam connection to the flanged plate of the adapter.

Referring to the drawings, there is shown a spinning adapter 1 which may be applied to any type of machine tool having a rotating spindle. The headstock 2 of the machine tool illustrated in FIG. 1 has a chuck 3 on the rotating spindle, not shown, for holding and rotating the workpiece 4 to accomplish the spinning operation.

The spinning adapter 1 is assembled on the carriage 5 of the machine tool bed and may be moved longitudinally of the bed as will be described and transversely of the bed by the crank 6.

The spinning adapter has an elongated quill 7 which has a flange 8 at the forward end and is closed at the rear by the end cap 9. The quill 7 is supported within the support block 10 and slides therein. Block 10 in turn has an annular flange 11 at the bottom which is bolted by screws 12 which extend therethrough and into a plate 13 to secure the block 10 to the machine tool.

Quill 7 is moved back and forth longitudinally of carriage 5 within block 10 by the double acting pistons 14 which are supplied with fluid through conduits 15.

The quill 7 has a bracket 16 which is secured to end cap 9 of the quill and extends horizontally outwardly therefrom. The piston rods 17 of pistons 14 are secured to bracket 16 and extend within cylinders 18 which are connected to the block 10.

Inside of the quill 7 is located the elongated mandrel 19. Mandrel 19 may be of varying diameter to receive tubular workpiece 4 to be spun to the size desired and the inside diameter of quill 7 is of a size to permit receipt of the workpiece between mandrel 19 and quill 7.

Figure 5:
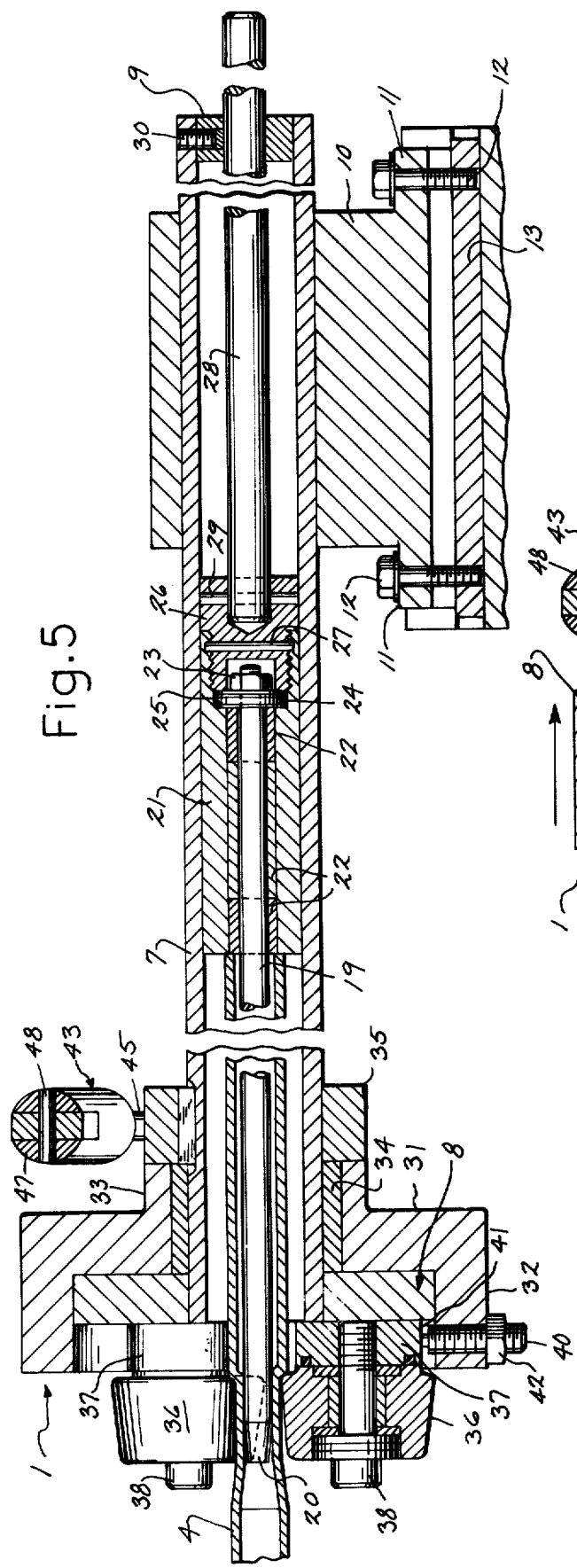
FIG. 5 is a longitudinal section through the adapter in initial spinning position.

The forward end 20 of mandrel 19 is tapered for insertion into the workpiece 4 and the rear end is journaled in a tubular sleeve 21 as illustrated in FIG. 5 which is adapted to slide inside of quill 7. The mandrel 19 is supported for rotation within sleeve 21 by axially spaced bearings 22.

Mandrel 19 is held within sleeve 21 by a nut 23 which is threaded onto the end of mandrel 19 against a thrust bearing 24 which engages a recess 25 in sleeve 21.

Sleeve 21 at the rear end is internally threaded and receives a cap 26 which is threaded into the rear end of sleeve 21. The cap 26 is also secured to sleeve 21 by key 27. The rear end of cap 26 has a bore to receive the adjusting rod 28 which is secured to the cap 26 by key 29.

Rod 28 extends rearwardly through the end cap 9 of quill 7 and may be moved axially to locate the mandrel 19 in the desired longitudinally position within quill 7. Once the selected position of mandrel 19 is obtained, it is then secured in place by threading set screw 30 against rod 28 within cap 9.

At the forward end of the quill 7 the flange 8 of the quill 7 is received within a recess within a plate 31 having a forwardly extending annular flange 32. The hub 33 of flanged plate 31 encircles bearing 34 which is located around the forward end of quill 7 in engagement with flange 8 of the quill. Flange 8 and plate 31 are held longitudinally in place by bracket 35 which is keyed to quill 7.

Referring particularly to FIG. 2, there is illustrated three circumferentially spaced reducing rollers 36. Each roller is bolted to the largest end portion of a cam arm 37 by a bolt 38. The other smaller end portion of each arm 37 is rotatably secured to flange 8 of quill 7 by a respective bolt 39. The three rollers 36 illustrated, although more could be used, are thus free to be rotated by arms 37 to various reducing positions depending on the dimensions of workpiece 4 to be spun.

The rollers 36 are fixed in the desired reducing position by cam elements such as set screws 40. Each set screw 40 is threaded through the annular flange 32 of plate 31 into engagement with the cam surface 41 of a respective arm 37 and is secured in such engaged position by the nuts 42 threaded onto the outer end of the set screws 40 into engagement with annular flange 32 of plate 31. The circumferential location of rollers 36 depends on the size of the I.D. of the tubular workpiece 4 which is to be spun to a decreased dimension. The plate 31 is initially rotated in a clockwise direction to locate the rollers 36 in proper reducing position but the plate 31 is also rotatable in a counterclockwise direction.

The rotation of the flanged plate 31 is accomplished by the hydraulic unit 43. The cylinder 44 of the unit is supported on the bracket 35 keyed to quill 7. The piston rod 45 extends forwardly from the cylinder 44 and piston 46 and the head 47 of piston rod 45 is secured by the pivot pin 48 to the L-shaped bracket 49 in turn secured to the flanged plate 31. A rod 50 also extends rearwardly from piston 46 through the rear of cylinder 44 and is threaded on the outer end to receive the nut 51. The nut 51 is threaded into engagement with the spacer 52 and this regulates the length of the stroke of piston rod 45 and rotation of flanged plate 31.

In the operation of the invention, the spinning adapter is initially secured to the carriage 5 and the machine tool in line with the chuck 3 with the mandrel 19 in a withdrawn position.

The initial setting of the rollers 36 is accomplished by rotating the flanged plate 31 clockwise by actuation of hydraulic unit 43 until nut 51 engages the spacer 52 at the rear of the hydraulic unit 43.

A gauge plug, not shown, of the O.D. desired in the spun tubular workpiece 4 is clamped in chuck 3, each roller 36 is then pivoted into engagement with the gauge plug and is then secured in the predetermined reducing position by adjusting the set screws 40 into engagement with cam surface 41 of each cam arm 37 and then securing the set screws in place by tightening nuts 42 against annular flange 32 of plate 31.

The adapter is then withdrawn on carriage 5 from the headstock 2 of the machine tool, the gauge plug is removed from chuck 3 and the tubular workpiece 4 is clamped into place by chuck 3. The adapter is moved toward the headstock 2 and mandrel 19 is moved axially of the quill 7 and workpiece 4 to the proper position by adjusting rod 28 so that the rollers 36 will spin the tube or workpiece 4 onto mandrel 19 to the predetermined dimension. Rod 28 is secured in place by tightening set screw 30 against the rod.

Figure 6:
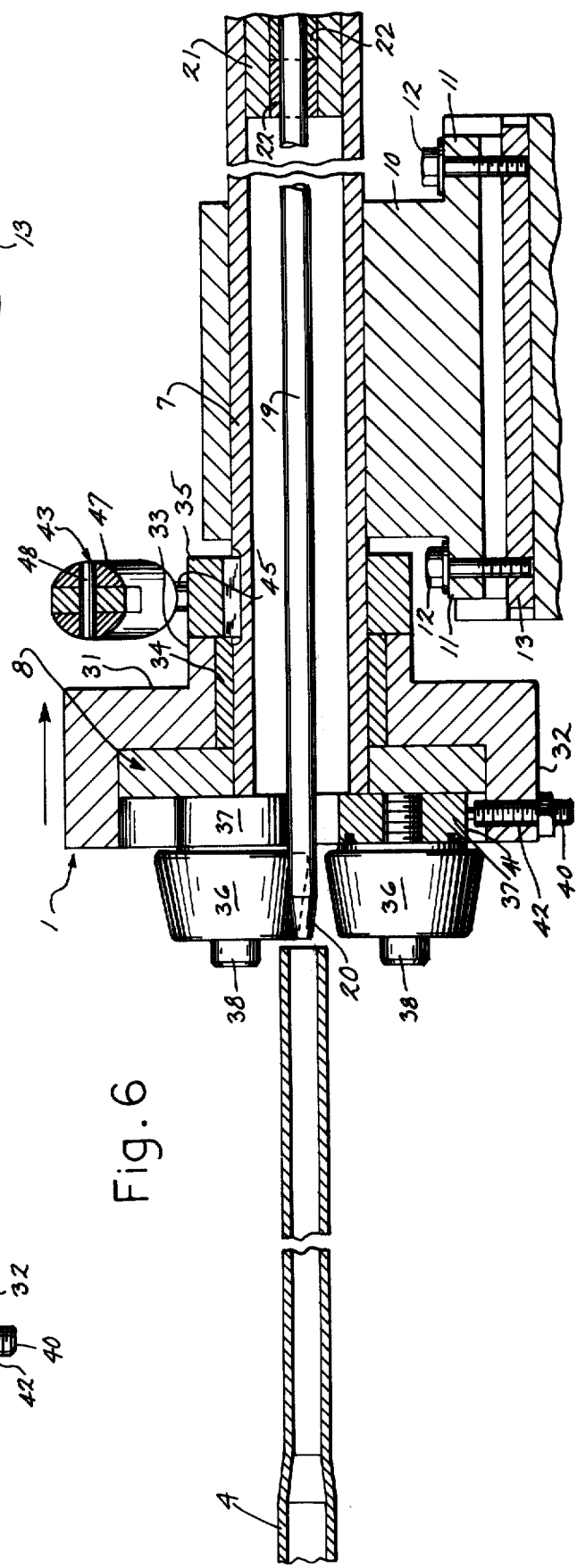
FIG. 6 is a longitudinal section through the adapter in final spinning position.

The spinning operation is then begun by initiating rotation of workpiece 4 by chuck 3 and gradually withdrawing the adapter quill 7 from the headstock 2 of the machine tool at a selected speed through actuation of pistons 14 which are secured to quill 7 by hydraulic fluid from a source not shown. This axial movement of quill 7 withdraws mandrel 19 from workpiece 4 and simultaneously moves the reducing rollers 36 rearwardly against the workpiece 4 to spin the tubular workpiece 4 to the predetermined size desired. FIG. 5 illustrates the starting position of the adapter and FIG. 6 shows the position of the parts and the workpiece 4 upon completion of the spinning operation.

The workpiece 4 is removed from chuck 3 and the above described steps are repeated on successive tubes or workpieces 4 except that if tubes 4 are to be spun to the same O.D. as the initial tube, it is not necessary to use the gauge plug again to reset the rollers.

Tests have shown that the tensile strength of the workpiece 4 in the spinning operation is improved by about 40 percent. Furthermore the outside diameter of the spun tube or workpiece is held to a tolerance limit of about 0.001 of an inch while the inside diameter is held to a tolerance limit of about 0.0005 of an inch.

Various modes of carrying out the invention are contemplated as being within the scope of the following claims particularly pointing out and distinctly claiming the subject matter regarded as the invention.

I claim:

1. A spinning adapter for assembly on the bed of a machine tool having rotatable means for holding a tubular workpiece to be spun to a predetermined internal and external diameter, a support block on the adapter, means to connect the support block to the bed of the machine tool in a predetermined position said adapter having a frame received within said block and adapted for longitudinal movement therein, a mandrel having substantially the internal diameter of said workpiece secured within the frame and adapted to be inserted within said workpiece, a plurality of reducing rollers journaled on said frame at fixed pivot points circumferentially around said mandrel at the end of the frame adjacent the machine tool and disposed to rotate about said pivot points freely of the frame and fixed in engagement with the workpiece assembled on said mandrel, means providing relative rotation of the workpiece and rollers, and means on the adapter effecting relative axial movement between the support block and frame to spin the I.D. of the workpiece on the mandrel by said rollers to the O.D. of the mandrel as the mandrel and the rollers are simultaneously moved longitudinally of the workpiece away from the rotatable means of the machine tool.

2. A spinning adapter for assembly on the bed of a machine tool having a rotary spindle with means for holding a tubular workpiece and rotating the same, said spinning adapter comprising a hollow quill of an inner diameter to receive said tubular workpiece, a support block through which the quill extends and is disposed for longitudinal movement within said block, said support block adapted to be connected to the bed of the machine tool, a radially extending flange at the forward end of the quill facing the spindle of the machine tool, a mandrel secured within said quill and adapted to be inserted within the tubular workpiece when the latter is received within the quill, a plurality of circumferentially spaced freely rotatable reducing rollers projecting forwardly from said flange, pivotal means pivoting each roller at a fixed pivot point to the outer face of the flange around the mandrel, said pivotal means being adapted to pivot the rollers on the fixed pivot point into a position where the rollers are disposed in fixed reducing engagement with the tubular workpiece when the latter is received in the quill and located over said mandrel, and means on the adapter to effect axial withdrawal of the quill through the support block away from the spindle of the machine tool and thereby simultaneously effecting relative axial movement between the workpiece and the rollers and mandrel while the workpiece is rotated by the spindle to spin the workpiece against the mandrel and establish the I.D. of the workpiece in conformance with the O.D. of the mandrel.

3. The spinning adapter of claim 1, in which the means for relative axial movement between the workpiece and rollers and mandrel simultaneously moves the rollers and mandrel axially away from the rotary spindle during the spinning operation to gradually withdraw the mandrel from the workpiece as the workpiece is spun onto the mandrel progressively by the rollers.

4. The spinning adapter of claim 1, in which the pivotally securing of each roller to the flange of the quill is effected by rotatably securing each roller to an arm which is pivotally secured to the flange of the quill at said fixed pivot point with each arm having a cam surface, and adjustable cam means engaging the cam surface of each arm to pivot the same and fix each roller in the position desired for spinning the tubular workpiece.

5. The spinning adapter of claim 4, and means to simultaneously rotate the cam means to different locations relative to the cam surfaces of each arm and fix the same thereon to open or close the rollers relative to the workpiece to be spun.

6. The spinning adapter of claim 1, wherein an annularly flanged plate is rotatably assembled on the quill to the rear of the flange of the quill with the annular flange of the plate overlying the flange of the quill, the pivotal means being a plurality of rotatable circumferentially spaced arms pivoted at one end portion at said fixed pivot point to the flange of the quill and having a cam surface on the sides thereof, a roller pivoted to each arm at the opposite end portion, and set screws extending through the annular flange of the flanged plate at circumferentially spaced locations and into engagement with the respective cam surface of each arm to hold the rollers in engagement with the workpiece to be spun to a smaller dimension, and means to rotate the annularly flanged plate clockwise or counterclockwise to move the set screws to different locations for engaging the cam surface of said arms to open or close the rollers.

7. The spinning adapter of claim 6, wherein the means for rotating the annularly flanged plate comprises, a mounting bracket secured to the quill at the rear of the flanged plate, a hydraulic unit secured to the mounting bracket and having a piston rod extending forwardly therefrom, means securing said piston rod to the flanged plate to rotate the plate clockwise and counterclockwise, a cylinder in the hydraulic unit, a piston secured to the inner end of the piston rod within the cylinder, a rod extending rearwardly from the rear end of the cylinder, a spacer located on the rod extension, and a nut threaded thereon against the spacer to regulate the movement of the piston rod and limit rotation of the flanged plate.

8. The spinning adapter of claim 6, wherein a cap is threaded into the inner end of the tubular sleeve and keyed thereto, and a bore is located in the outer end of the sleeve and receives an adjusting rod which is keyed to the cap, an end cap secured to the rear of the quill through which the adjusting rod extends, said adjusting rod being adapted for longitudinal movement to locate the mandrel in different axial positions relative to the quill, and means to secure the adjusting rod in the longitudinally established position.

* * * * *